(12) United States Patent
den Boer et al.

(10) Patent No.: US 11,467,461 B2
(45) Date of Patent: Oct. 11, 2022

(54) ELECTROCHROMIC DEVICE INCLUDING TRANSPARENT CONDUCTORS HAVING REDUCED SHEET RESISTANCE IN A DIRECTION OF CURRENT FLOW

(71) Applicant: HELIOTROPE TECHNOLOGIES, INC., Alameda, CA (US)

(72) Inventors: Willem den Boer, Brighton, MI (US); Amir Bayati, Santa Clara, CA (US); Guillermo Garcia, Oakland, CA (US); John Santos, Alameda, CA (US); George Rubin, Alameda, CA (US)

(73) Assignee: HELIOTROPE EUROPE S.L., Bilbao (ES)

( * ) Notice: Subject to any disclaimer, the term of this patent is extended or adjusted under 35 U.S.C. 154(b) by 158 days.

(21) Appl. No.: 16/888,257

(22) Filed: May 29, 2020

(65) Prior Publication Data
US 2020/0387039 A1 Dec. 10, 2020

Related U.S. Application Data

(60) Provisional application No. 62/857,600, filed on Jun. 5, 2019.

(51) Int. Cl.
*G02F 1/155* (2006.01)
*G02F 1/153* (2006.01)

(52) U.S. Cl.
CPC .......... *G02F 1/155* (2013.01); *G02F 1/1533* (2013.01); *G02F 2001/1555* (2013.01)

(58) Field of Classification Search
CPC . G02F 1/155; G02F 1/1533; G02F 2001/1555
(Continued)

(56) References Cited

U.S. PATENT DOCUMENTS 4,874,229 A * 10/1989 Ito .......................... G02F 1/155
359/275
5,066,111 A 11/1991 Singleton et al.
(Continued)

FOREIGN PATENT DOCUMENTS

CA 2015801 A1 * 11/1990 ....... B32B 17/10036
JP 62143032 A * 6/1987
(Continued)

OTHER PUBLICATIONS

International Search Report and Written Opinion of the International Search Authority for International Patent Application No. PCT/US2020/035333, dated Sep. 16, 2020, 10 pages.

*Primary Examiner* — George G. King
(74) *Attorney, Agent, or Firm* — The Marbury Law Group PLLC

(57) ABSTRACT

An electrochromic (EC) device includes a first substrate, a second substrate, a transparent first conductor disposed between the first and second substrates, a transparent second conductor disposed between the first and second substrates, a working electrode disposed between the first and second conductors, a counter electrode disposed between the working electrode and the second conductor, and an electrolyte disposed between the working and counter electrodes. At least one of the first or second conductors is a multipart conductor which includes a transparent first conductive film, a first contact strip extending lengthwise in a first direction which is perpendicular to a second direction, along a first side of the EC device, and first conductive lines extending from the first contact strip toward an opposing second side of the EC device. The multipart conductor has a lower effective sheet resistance in the second direction than in the first direction.

18 Claims, 3 Drawing Sheets

(58) Field of Classification Search
USPC .................................................. 359/265–275
See application file for complete search history.

(56) References Cited

U.S. PATENT DOCUMENTS

| | | | | |
|---|---|---|---|---|
| 6,118,573 | A * | 9/2000 | Kubo | ...................... G02F 1/155 |
| | | | | 252/511 |
| 6,785,036 | B1 * | 8/2004 | Berneth | .................. G02F 1/155 |
| | | | | 359/268 |
| 9,684,219 | B2 | 6/2017 | Garcia et al. | |
| 9,791,760 | B2 | 10/2017 | Garcia et al. | |
| 2002/0005977 | A1 | 1/2002 | Guarr et al. | |
| 2003/0227664 | A1 * | 12/2003 | Agrawal | ............... G02F 1/1533 |
| | | | | 359/269 |
| 2004/0191618 | A1 * | 9/2004 | Morin | ............... B32B 17/10761 |
| | | | | 429/163 |
| 2008/0314626 | A1 * | 12/2008 | Moore | .................. G06F 3/0446 |
| | | | | 174/255 |
| 2016/0139476 | A1 | 5/2016 | Garcia et al. | |
| 2016/0266460 | A1 * | 9/2016 | Kloeppner | ............ G02F 1/1533 |
| 2017/0059957 | A1 | 3/2017 | Garcia et al. | |
| 2018/0088426 | A1 | 3/2018 | Posset et al. | |
| 2018/0364540 | A1 | 12/2018 | Winoto et al. | |
| 2019/0041680 | A1 * | 2/2019 | Yoshida | .............. G02F 1/13306 |

FOREIGN PATENT DOCUMENTS

| | | | | |
|---|---|---|---|---|
| JP | 2017130408 | A | * | 7/2017 |
| KR | 20080051280 | A | * | 6/2008 |
| KR | 1020140089416 | A | | 7/2014 |
| KR | 1020150087012 | A | | 7/2015 |

* cited by examiner

ELECTROCHROMIC DEVICE INCLUDING TRANSPARENT CONDUCTORS HAVING REDUCED SHEET RESISTANCE IN A DIRECTION OF CURRENT FLOW

FIELD

The present invention is generally directed to electrochromic (EC) devices that include conductive lines configured to decrease an effective sheet resistance of a transparent conductive film in a current flow direction.

BACKGROUND OF THE INVENTION

Residential and commercial buildings represent a prime opportunity to improve energy efficiency and sustainability in the United States. The buildings sector alone accounts for 40% of the United States' yearly energy consumption (40 quadrillion BTUs, or "quads", out of 100 total), and 8% of the world's energy use. Lighting and thermal management each represent about 30% of the energy used within a typical building, which corresponds to around twelve quads each of yearly energy consumption in the US. Windows cover an estimated area of about 2,500 square km in the US and are a critical component of building energy efficiency as they strongly affect the amount of natural light and solar gain that enters a building. Recent progress has been made toward improving window energy efficiency through the use of inexpensive static coatings that either retain heat in cold climates (low emissive films) or reject solar heat gain in warm climates (near-infrared rejection films).

Currently, static window coatings can be manufactured at relatively low cost. However, these window coatings are static and not well suited for locations with varying climates. A window including an electrochromic (EC) device overcomes these limitations by enhancing window performance in all climates.

SUMMARY

In one embodiment, an electrochromic (EC) device includes a first substrate, a second substrate, a transparent first conductor disposed between the first and second substrates, a transparent second conductor disposed between the first and second substrates, a working electrode disposed between the first and second conductors, a counter electrode disposed between the working electrode and the second conductor, and an electrolyte disposed between the working and counter electrodes. At least one of the first or second conductors comprises a multipart conductor which includes a transparent first conductive film, a first contact strip extending lengthwise in a first direction which is perpendicular to a second direction, along a first side of the EC device, and first conductive lines extending from the first contact strip toward an opposing second side of the EC device. The multipart conductor has a lower effective sheet resistance in the second direction than in the first direction.

DETAILED DESCRIPTION OF THE EXEMPLARY EMBODIMENTS

Figure 1:
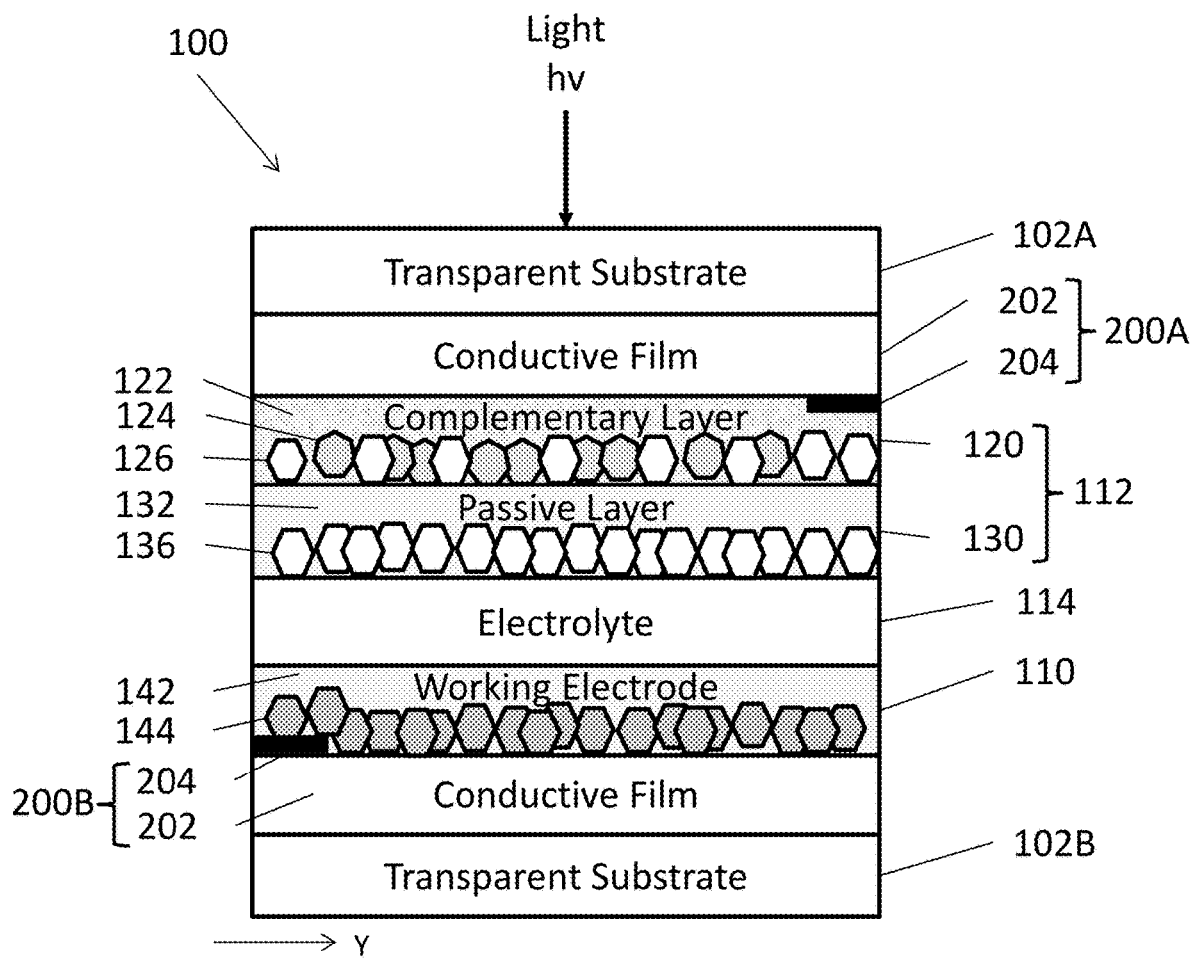
FIG. 1 is a schematic side view representation of EC device, according to various embodiments of the present disclosure.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being disposed "on" or "connected to" another element or layer, it can be directly on or directly connected to the other element or layer, or intervening elements or layers may be present. In contrast, when an element is referred to as being disposed "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

EC Devices

FIG. 1 is schematic view of an EC device 100, according to various embodiments of the present disclosure. It should be noted that the thickness of the layers and/or size of the components of the devices in FIG. 1 are not drawn to scale or in actual proportion to one another other, but rather are shown as representations. One or more layers of the EC device 100 may be formed using the methods and materials described above. As such, the materials of the EC device are not described in detail below.

Referring to FIG. 1, the EC device 100 may include opposing first and second substrates 102A, 102B. The first and second substrates 102A, 102B may be transparent substrates, such as substrates formed of optically transparent glass or plastic. However, in some embodiments, the substrates 102A, 102B may be omitted. For example, the EC device 100 may refer to a coating formed of the various layers of FIG. 1 that are disposed between the substrates 102A, 102B.

First and second transparent conductors 200A, 200B may be respectively disposed on the first and second substrates 102A, 102B. A counter electrode 112 may be disposed on the first transparent conductor 200A, and a working electrode 110 may be disposed on the second transparent conductor 200B. An electrolyte 114 may be disposed on between the working electrode 110 and the counter electrode 112.

Transparent Conductors

Figure 2:
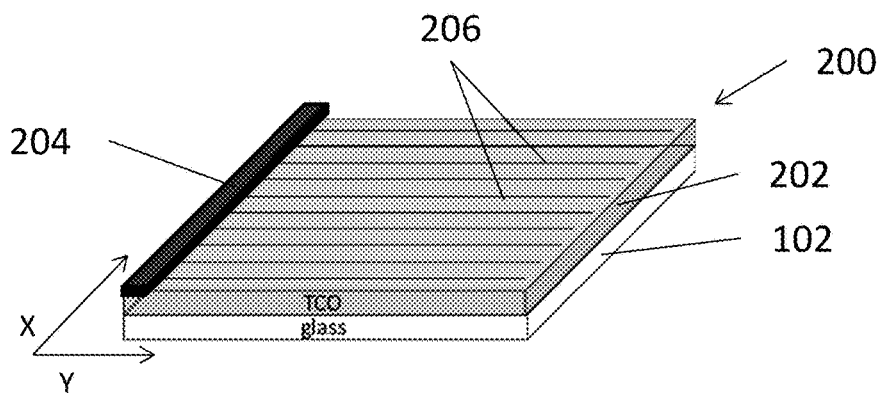
FIG. 2 is a schematic plan view of a transparent conductor and substrate that may be included in the EC device of FIG. 1, according to various embodiments of the present disclosure.
Figure 3:
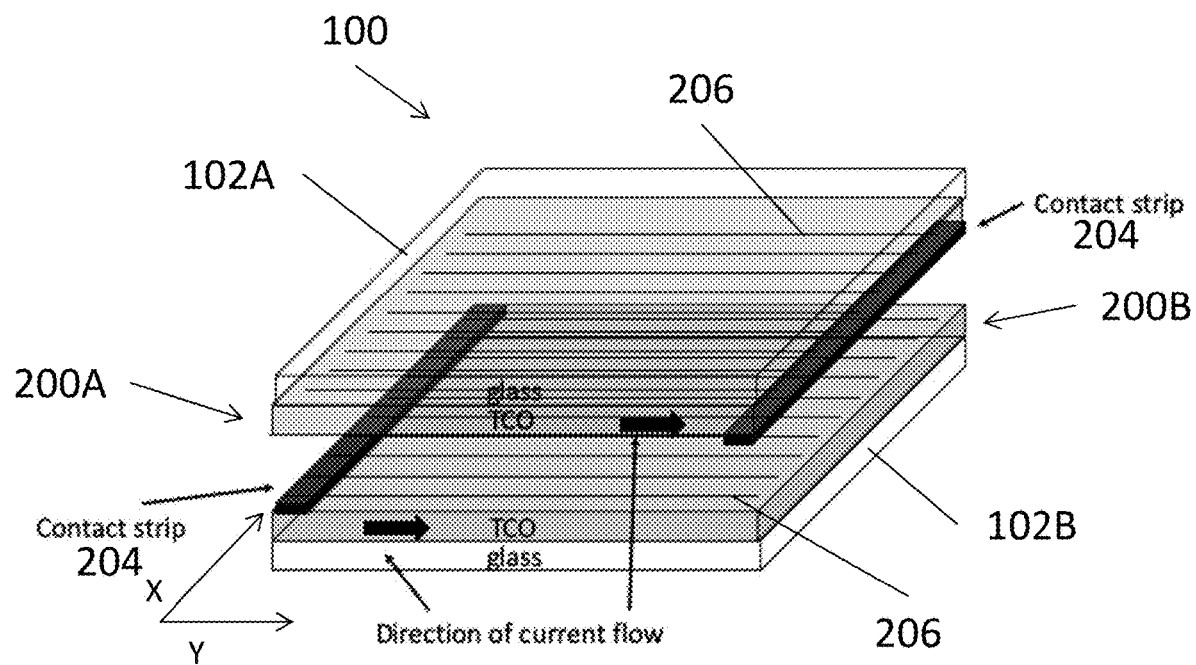
FIG. 3 is a schematic plan view showing current flow through the EC device of FIG. 1.

FIG. 2 is a schematic view of a transparent conductor 200 and substrate 102 that may be included in the EC device 100 of FIG. 1, according to various embodiments of the present disclosure, and FIG. 3 is a schematic view showing current flow through the EC device of FIG. 1.

Referring to FIG. 2, the transparent conductor 200 may comprise either of the transparent conductors 200A or 200B of FIGS. 1 and 3, and the substrate 102 may comprise either of the substrates 102A or 102B of FIGS. 1 and 3.

The transparent conductor 200 (which may be referred to as a "multipart conductor") may include a transparent conductive film 202 disposed on the substrate 102. The conductive film 202 may be fabricated using inorganic and/or organic materials. For example, the conductive film 202 may comprise an inorganic transparent conducting oxide (TCO) material, such as indium tin oxide (ITO), fluorine doped tin oxide (FTO), or aluminum doped zinc oxide (AZO). In other examples, the conductive film 202 may include graphene and/or various polymers.

The transparent conductor 200 may include a contact strip 204 disposed on one edge of the conductive film 202. The contact strips may comprise any electrically conductive metal or metal alloy, such as copper, silver, aluminum or alloys thereof. The contact strips 204 of the first and second transparent conductors 200A, 200B may be positioned on opposing sides of the EC device 100 and may extend lengthwise in an X direction. The contact strips 204 may be connected to a current/voltage supply (not shown), such that current flows between the contact strips and through the conductive films 202 and the EC device 100, in a Y direction (e.g., current flow direction) that is substantially perpendicular to the X direction. Accordingly, the contact strips 204 may be configured to spread the current evenly across the EC device 100, in the X direction.

TCO materials of the conductive film 202 generally have a relatively high sheet resistance. For example, FTO typically has a sheet resistance of about 15 ohm/square. For larger electrochromic devices, such as electrochromic windows, the relatively high sheet resistance of the TCO may limit the switching speeds between the dark and the bright (i.e., bleached) states.

Accordingly, in order to improve switching performance, the transparent (i.e., multipart) conductor 200 may include conductive lines 206. The conductive lines 206 may be formed of metals such as Cu, Ag, Al, Mo, Cr, or the like, alloys thereof, or multilayers thereof.

The conductive lines 206 may extend from the contact strip 204 to an opposing edge of the conductive film 202. In one embodiment, the conductive lines 206 may be substantially parallel to one another and may extend generally in the Y direction across the conductive film 202. In other words, the conductive lines 206 may not directly contact one another and may be equally spaced apart.

The width of the conductive lines 206 may be about 5 microns (i.e., micrometers) or less, such as 0.5 to 5 microns, so that they are not visible to unaided human eyes. For example, the conductive lines 206 may have a width ranging from about 0.5 µm to about 5 µm, such as about 2 µm to about 4 µm, such as about 3 µm. A pitch of the conductive lines may range from about 50 µm to about 200 µm, such as from about 75 µm to about 125 µm, or about 100 µm.

If the conductive lines 206 have a circular cross section perpendicular to their axis (i.e., if the conductive lines are cylindrical microwires), then their diameter equals to their width (which is the dimension that is parallel to the face (i.e., major plane) of the substrate 102).

If the conductive lines 206 have a polygonal (e.g., rectangular) cross section perpendicular to their axis (i.e., if the conductive lines are printed traces on the conductive film 202), then the thickness of the conductive lines 206 may range from about 25 nm to about 700 nm, such as from about 40 nm to about 750 nm, or from about 50 nm to about 600 nm.

Figure 4:
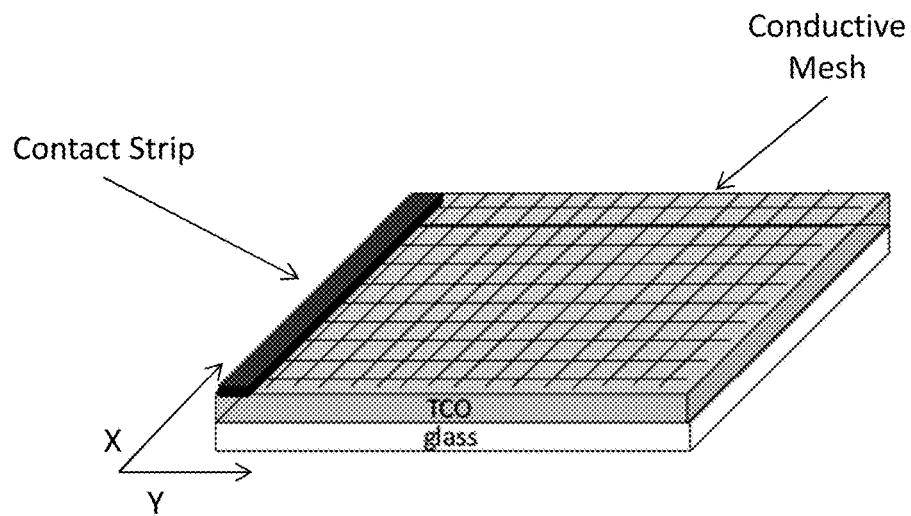
FIG. 4 is a schematic plan view of a conventional transparent conductor containing a mesh.

In contrast, FIG. 4 is a schematic view of a conventional transparent conductor. As shown in FIG. 4, rather than conductive lines 206, the conventional transparent conductors include a conductive mesh or grid comprising intersecting metal lines that extend in both X and Y directions and that are electrically and/or physically connected to a contact strip.

However, as shown in FIG. 3, current flows through an EC device in substantially the Y direction. Accordingly, the present inventors discovered that contact lines 206 that extend in the X direction may be omitted without reducing current carrying capacity and/or switching speed, since the conductive lines 106 reduce sheet resistance in the Y direction (e.g., the direction of current flow). In other words, the present inventors discovered that conductive lines that extend in, and reduce contact resistance in, the X direction may be omitted, since the X direction is substantially perpendicular to the direction of current flow.

As such, a total area of the EC device 100 that is covered by opaque metal lines may be reduced by about 50%, as compared to a conventional EC device including transparent conductors having a conductive mesh. Accordingly, light transmittance may be increased by a corresponding amount, without negatively affecting device operation.

The following Table I includes properties of some exemplary conductive line materials used in the calculation of effective sheet resistance for metal mesh/TCO and metal lines/TCO combinations.

TABLE I

Material properties

| | Resistivity (microohmcm) |
|---|---|
| Al | 4 |
| Ag | 2 |
| Mo | 13 |
| Cu | 2.5 |
| Cr | 20 |
| ITO | 200 |

The following Tables II and III show examples of metal mesh and metal lines and their effective sheet resistance and transmittance.

TABLE II

| Layer stack examples | | | Metal mesh examples | | | |
|---|---|---|---|---|---|---|
| Glass | Layer thickness (nm) | Rsheet (ohm/sq) | Line width (μm) | Line pitch (μm) | Effective Rsheet (ohm/sq) | Tvis sq mesh/ Tvis glass |
| Mo | 50 | 2.60 | | | | |
| Al | 200 | 0.2 | | | | |
| Mo | 50 | 2.6 | | | | |
| Combination | 300 | 0.173 | 3 | 100 | 5.78 | 0.94 |
| Glass | Layer thickness (nm) | Rsheet (ohm/sq) | | | | |
| Mo | 50 | 2.60 | | | | |
| Ag | 200 | 0.1 | | | | |
| Mo | 50 | 2.6 | | | | |
| Combination | 300 | 0.093 | 3 | 100 | 3.10 | 0.94 |
| Glass | Layer thickness (nm) | Rsheet (ohm/sq) | Line width (μm) | Line pitch (μm) | Effective Rsheet (ohm/sq) | Tvis sq mesh/ Tvis glass |
| Mo | 300 | 0.433 | 3 | 100 | 14.44 | 0.94 |

TABLE III

| Glass | Layer thickness (nm) | Rsheet (ohm/sq) | Line width (μm) | Line pitch (μm) | Effective Rsheet (ohm/sq) | Tvis (ITO + lines)/ Tvis ITO | |
|---|---|---|---|---|---|---|---|
| ITO (blanket) | 200 | 10 | | | | | |
| Mo | 50 | 2.6 | | | | | |
| Ag | 200 | 0.1 | | | | | |
| Mo | 50 | 2.6 | | | | | |
| Combination | 500 | | 3 | 100 | 2.36 | 0.97 | parallel to lines |
| | | | | | 9.7 | | perpendicular to lines |
| Glass | Layer thickness (nm) | Rsheet (ohm/sq) | Line width (μm) | Line pitch (μm) | Effective Rsheet (ohm/sq) | Tvis (ITO + lines)/ Tvis ITO | |
| ITO (blanket) | 200 | 10 | | | | | |
| Mo | 50 | 2.6 | | | | | |
| Al | 200 | 0.200 | | | | | |
| Mo | 50 | 2.6 | | | | | |
| Combination | 600 | | 3 | 100 | 3.66 | 0.97 | parallel to lines |
| | | | | | 9.7 | | perpendicular to lines |
| Glass | Layer thickness (nm) | Rsheet (ohm/sq) | Line width (μm) | Line pitch (μm) | Effective Rsheet (ohm/sq) | Tvis (ITO + lines)/ Tvis ITO | |
| ITO (blanket) | 200 | 10 | | | | | |
| Mo | 300 | 0.433 | | | | | |
| Combination | 500 | | 3 | 100 | 5.91 | 0.97 | parallel to lines |
| | | | | | 9.7 | | perpendicular to lines |

As can be seen in Tables II and III, for a 100 micron line pitch and 3 micron line width, the improvement in transmittance is about 3% per substrate for conductive lines as compared to metal mesh without sacrificing current density and switching speed. For the overall electrochromic device with two transparent electrodes the improvement in transmittance may be about 3% or more, such as from about 3% to about 8%, or from about 5% to about 7%, for example about 6% greater than that of a metal mesh configuration.

In addition, the conductive lines 206 provide an effective sheet resistance for the first and/or second transparent conductors 200A, 200B (e.g., the multipart conductor) of less than about 6 ohm/sq., such as an effective sheet resistance ranging from about 2 to about 6 ohm/sq. The effective sheet resistance of the multipart conductor is less than 10 ohm/sq. in the Y direction, and the effective sheet resistance of the multipart conductor is greater than 10 ohm/sq. in the X direction.

Figure 5A:
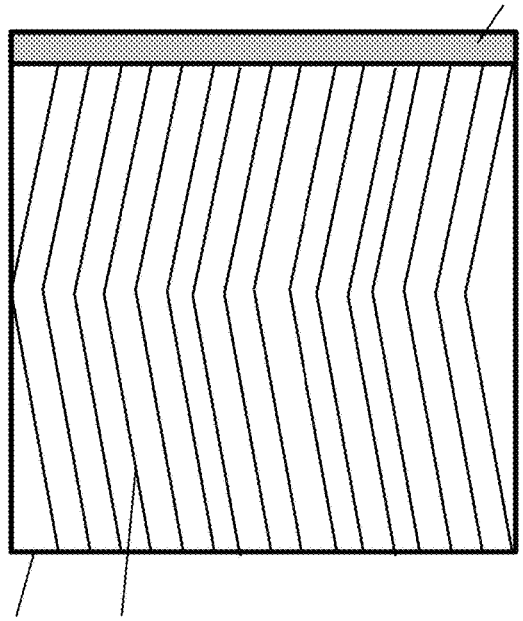
FIG. 5A is a top view of a first transparent conductor.
Figure 5B:
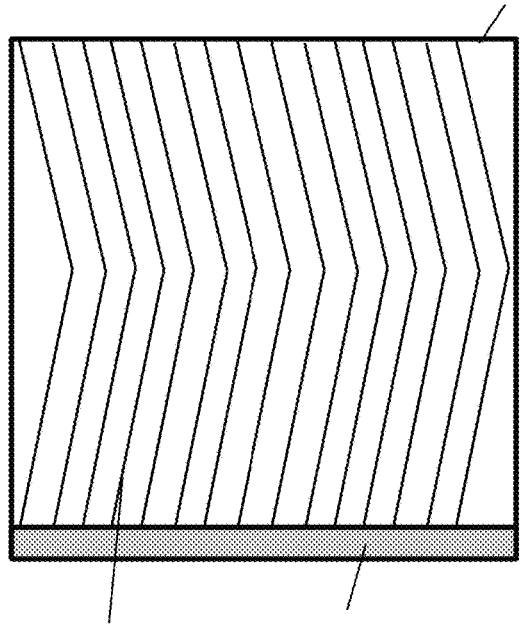
FIG. 5B is a top view of a second transparent conductor.
Figure 5C:
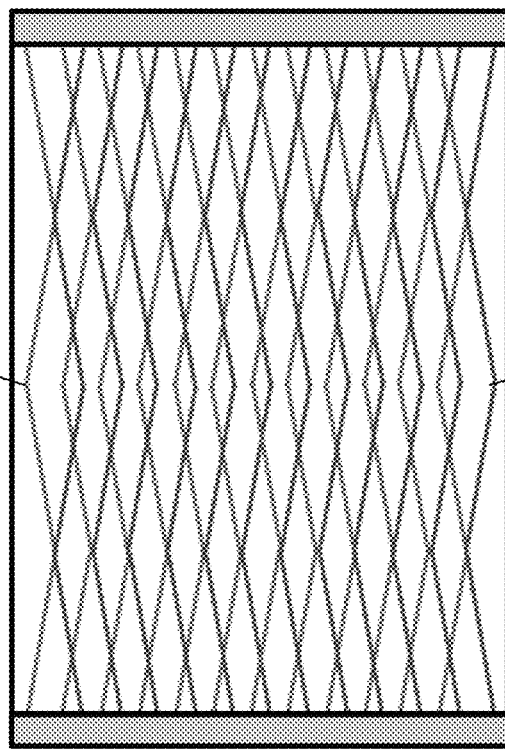
FIG. 5C is a top view of both of the first and second transparent conductors that are overlapped in an assembled EC device.

FIG. 5A is a top view of a transparent conductor 201A, FIG. 5B is a top view of a transparent conductor 201B, and FIG. 5C is a top view of both transparent conductors 201A, 201B, positioned as assembled in an EC device. The transparent conductors 201A, 201B are similar to, and may be used in place of, the transparent conductors 200A, 200B, in the EC device 100 of FIGS. 1-3. Accordingly, only the difference therebetween will be discussed in detail.

Referring to FIGS. 5A-5C, the transparent conductor 201A includes conductive lines 206A that extend from a contact strip 204, and the transparent conductor 201B includes conductive lines 206B that extend from a contact strip 204. However, unlike the conductive lines 206 of the transparent conductors 200A, 200B, the conductive lines 206A, 206B do not extend exclusively in the Y direction. For example, the conductive lines 206A, 206B may be diagonal (i.e., straight lines extend in a direction between the X and Y directions at an angle less than 45 degrees, such as 5 to 30 degrees from the Y direction), curved or angled (e.g., contain plural segments that extend at a non-zero angle with respect to each other, as shown in FIGS. 5A-5C, rather than extending in substantially straight lines in the Y direction). For example, the angled conductive lines 206A, 206B may extend in a zig-zag, saw tooth, or serpentine pattern.

In some embodiments, the conductive lines 206A may be disposed in a first pattern and the conductive lines 206B may be disposed in a second pattern. For example, the first pattern may be the inverse of, or otherwise different from, the second pattern. In some embodiments, the conductive lines 206A may be non-parallel to the conductive lines 206B, such as when the transparent conductors 201A, 201B arranged in an EC device.

Accordingly, as shown in FIG. 5C, when the transparent conductors 200A, 200B are disposed in an EC device, the overlap between the conductive lines 206A, 206B is reduced, when viewed through a light transmission direction of the EC device 100. Accordingly, the patterning of the conductive lines 206A, 206B prevents and/or reduces a Moire effect, which may result when similarly patterned lines or grids of two different transparent conductors are overlapped in a light transmission direction.

Electrodes

The counter electrode 112 should be capable of storing enough charge to sufficiently balance the charge needed to cause visible tinting electrochromic nanoparticles of the working electrode 110. In various embodiments, the counter electrode 112 may be formed as a conventional, single component film, a multilayer film, a nanostructured film, or a nanocomposite layer.

In some embodiments, the counter electrode 112 may include a complementary layer 120 and a passive layer 130. The complementary layer 120 may include metal oxide nanoparticles disposed in a metal oxide matrix 122. In various embodiments, the complementary layer 120 may optionally include a flux material, as discussed in detail below with regard to the passive layer 130.

The matrix 122 may be formed of a lithium metal oxide. For example, the matrix 122 may be formed of $LiNbO_3$ (lithium niobate), $Li_2WO_4$ (lithium tungstate), $LiTaO_3$ (lithium tantalite), combinations thereof, or the like.

The nanoparticles may include complementary nanoparticles 124 comprising at least one complementary (e.g., color balancing) material, which may be transparent to NIR radiation, but which may be oxidized in response to application of a bias, thereby causing absorption of visible light radiation.

In some embodiments, the complementary layer 120 may include passive nanoparticles 126 comprising at least one passive material that is optically transparent to both visible and NIR radiation during the applied biases. The passive nanoparticles 126 may operate as conductivity enhancer.

Examples of passive nanoparticles 126 may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, $V_2O_5$, or mixtures thereof.

In some embodiments, the complementary layer 120 may include NiO complementary nanoparticles 124 and $In_2O_3$ passive nanoparticles 126 disposed in a $LiNbO_3$ matrix 122. The complementary layer 120 may also optionally comprise a flux material comprising a LiRAP material, as described below.

The passive layer 130 may include mixture of a flux material 132 and passive nanoparticles 136. Herein, when a flux material is included in a component of the EC device 100, the flux material may form a mixture with other elements of the component, such as nanoparticles, may form a coating on such nanoparticles (e.g., a core-shell structure), and/or may form a matrix in which nanoparticles are disposed. In some embodiments, the flux material and nanoparticles may be impregnated in a metal oxide matrix of a corresponding component.

The flux material 132 may comprise any suitable material that melts at a temperature that is lower than a sintering, crystallization, and/or phase transition temperature of metal oxide nanoparticles included in the EC device 100. For, example, the flux material 132 may have a melting temperature ranging from about 25° C. to about 500° C., such as from about 50° C. to about 450° C., or from about 100° C. to about 400° C. For example, the flux material 132 may be configured to melt when the EC device 100 is heated, such as during a tempering or heat-bending process applied to the EC device 100.

In some embodiments, the flux material 132 may comprise a lithium salt material. For example, the flux material 132 may comprise a Li-rich anti-perovskite (LiRAP) material, in addition to, or in place of the above matrix precursor materials. An anti-perovskite is a compound having a crystal structure like a conventional perovskite but with the unit cell having the positive and negative species reversed. In a perovskite structure, the unit cell is face centered cubic. The negative atoms normally sit on the face centers and positive ions sit in the corners. Additionally, there will be a third type of atom, a cation, in the center of the cubic unit cell. In an antiperovskite structure, the locations of cations and anions are reversed. In the antiperovskite structure, of the type described herein, oxygen or sulfur atoms, for example, reside at centers of the unit cell, halogen atoms sit at corners of the unit cell, and lithium ions reside in the face centers of the unit cell. It is believed that the face centered species may be the most mobile species in the unit cell.

According to various embodiments, the LiRAP material may have the formula $Li_3OX$, where X may be a halogen or a combination of halogens. For example, X may be F, Cl, Br, I, or any combination thereof. In some embodiments, the LiRAP material may be $Li_3OI$. In some embodiments, the LiRAP material may also include one or more dopant species. In some embodiments, the LiRAP material may be aliovalently doped by replacing a first anion in the base structure with a second anion that has a valence more positive than that of the first atom.

The LiRAP material may be formed from constituent lithium salts. For example, the LiRAP material may be formed from an oxygen-containing lithium salt and a halogen salt of lithium. Examples of the oxygen-containing lithium salt include lithium hydroxide (LiOH) lithium acetate ($C_2H_3LiO_2$), lithium carbonate ($Li_2CO_3$), lithium oxide ($Li_2O$), lithium perchlorate ($LiClO_4$), lithium nitrate ($LiNO_3$), or any combination thereof. Examples of the halogen salt of lithium include lithium chloride (LiCl), lithium bromide (LiBr), lithium fluoride (LiF), lithium iodide (LiI), or any combination thereof. In some embodiments, the LiRAP material may be formed from LiOH and LiI.

The passive nanoparticles 136 may comprise at least one passive material that is optically transparent to both visible and NIR radiation during the applied biases. Examples of such passive counter electrode materials may include $CeO_2$, $CeVO_4$, $TiO_2$, indium tin oxide (ITO), $In_2O_3$ (Indium(III) oxide), $SnO_2$ (tin(IV) dioxide), manganese or antimony doped tin oxide, aluminum doped zinc oxide, ZnO (zinc oxide), gallium zinc oxide, indium gallium zinc oxide (IGZO), molybdenum doped indium oxide, $Fe_2O_3$, $V_2O_5$, or mixtures thereof.

In some embodiments, passive layer 130 may include a mixture of $CeO_2$ and $In_2O_3$ passive nanoparticles 136 and a LiRAP flux material 132. The passive layer 130 may also optionally include a $LiNbO_3$ matrix (not shown) in which the passive nanoparticles 136 and the flux material 132 are disposed.

In various embodiments, the working electrode 110 may include a mixture of a flux material 142 and doped or undoped electrochromic metal oxide nanoparticles 144. The working electrode 110 may optionally include a lithium metal oxide matrix (not shown) that may include any of the materials as described above with respect to the matrix 122.

The flux material 142 may include any of the materials described above with respect to the flux material 132. In one embodiment, the flux material 142 may be in the form of a matrix layer that surrounds the nanoparticles 144. In other embodiments, the flux material 142 may surround the nanoparticles 144 in a core-shell configuration, with the flux material 142 forming shells around nanoparticle cores.

Nanoparticles

As used herein, the term "nanoparticle" includes any suitable nanoparticle shape, such as a sphere, rod (e.g., nanorod or nanowire), a three dimensional polygon and/or an irregular shape. The precursor solution may include a single type of metal oxide nanoparticle, or mixtures of different types of metal oxide nanoparticles. The metal oxide nanoparticles may include crystalline, doped or un-doped, transition metal oxides. The metal oxide nanoparticles may be spherical and may have an average particle size ranging from about 1 to about 10 nm, such as from about 1.5 to about 5 nm, or from about 2 to about 3 nm. While spherical metal oxide nanoparticles may provide a wide level of porosity, which may enhance the switching kinetics, non-spherical metal oxide nanoparticles may also be used. In some embodiments, the metal oxide nanoparticles may be coated is an organic compound, such as an organic ligand.

For example, the metal oxide nanoparticles may be formed of a transparent conducting oxide (TCO) material, such as indium tin oxide (ITO), fluorine doped tin oxide (FTO), Nb—$TiO_2$, Al—ZnO zinc oxide, or the like, or mixtures thereof.

In some embodiments, the metal oxide nanoparticles may include electrochromic nanoparticles that vary in optical transmission according to an applied electrical bias. For example, suitable electrochromic materials may include any transition metal oxide which can be reduced and has multiple oxidation states, such as niobium oxide, tungsten oxide, molybdenum oxide, vanadium oxide, titanium oxide, and mixtures of two or more thereof. For example, the electrochromic nanoparticles may include ternary compositions of the type AxMzOy, where M represents a transition metal ion species in at least one transition metal oxide, and A represents at least one dopant. In some embodiments, the electrochromic nanoparticles may include doped or undoped $WO_{3-x}$, $Cs_xWO_{3-x}$, and/or $NbO_x$, nanoparticles, where $0 \leq x \leq 0.33$, such as $0 \leq x \leq 0.1$. Thus, when x=0 $WO_{3-x}$ is $WO_3$.

In the various embodiments, the metal oxide nanoparticles may include a first dopant species selected from cesium, rubidium, and lanthanides (e.g., cerium, lanthanum, praseodymium, neodymium, promethium, samarium, europium, gadolinium, terbium, dysprosium, holmium, erbium, thulium, ytterbium, and lutetium). In some embodiments, the metal oxide nanoparticles may include a second dopant species, which may be an intercalation ion species selected from lanthanides (e.g., cerium, lanthanum, praseodymium, neodymium, promethium, samarium, europium, gadolinium, terbium, dysprosium, holmium, erbium, thulium, ytterbium, and lutetium), alkali metals (e.g., lithium, sodium, potassium, rubidium, and cesium), and alkali earth metals (e.g., beryllium, magnesium, calcium, strontium, and barium). In other embodiments, the second dopant species may include a charged proton species.

In some embodiments, the metal oxide nanoparticles may include complementary (e.g., color balancing) nanoparticles that may complementary materials that are transparent to NIR radiation, but which may be oxidized in response to application of a bias, thereby causing absorption of visible light radiation. Examples of such complementary materials may include nickel oxide (e.g., $NiO_x$, where $1 \leq x \leq 1.5$, such as NiO), $Cr_2O_3$, $MnO_2$, $FeO_2$, $CoO_2$, $RhO_2$, or $IrO_2$, or mixtures thereof.

In some embodiments, the metal oxide nanoparticles may include passive nanoparticles comprising at least one passive material that is optically transparent to both visible and NIR radiation during the applied biases. Examples of passive materials may include $CeO_2$, $CeVO_2$, $TiO_2$, indium tin oxide, indium oxide, tin oxide, manganese or antimony doped tin oxide, aluminum doped zinc oxide, zinc oxide, gallium zinc oxide, indium gallium zinc oxide, molybdenum doped indium oxide, $Fe_2O_3$, $V_2O_5$, or mixtures thereof.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An electrochromic (EC) device comprising:
a first substrate;
a second substrate;
a transparent first conductor disposed between the first and the second substrates, the first conductor comprising:
  a transparent first conductive film disposed on the first substrate;
  a first contact strip disposed on the first conductive film and generally extending lengthwise in a first direction which is perpendicular to a second direction, along a first side of the EC device; and
  first conductive lines arranged in a first pattern and generally extending from the first contact strip toward an opposing second side of the EC device which may be diagonal, curved, zig-zag, saw tooth or serpentine;
a transparent second conductor disposed between the first and the second substrates, the second conductor comprising:
  a transparent second conductive film disposed on the second substrate;
  a second contact strip disposed on the second conductive film and generally extending lengthwise in the first direction, along the second side of the EC device; and
  second conductive lines arranged in a second pattern and generally extending from the second contact strip toward the first side of the EC device which may be diagonal, curved, zig-zag, saw tooth or serpentine;

a working electrode comprising an electrochromic material disposed between the first and the second conductors;

a counter electrode disposed between the working electrode and the second conductor; and an electrolyte disposed between the working electrode and the counter electrode;

wherein:

at least one of the first or second conductors has a lower effective sheet resistance in the second direction than in the first direction; and the first and second patterns are inverse patterns or sufficiently non-parallel patterns to reduce or prevent the occurrence of a Moire effect when the EC device is viewed in a light transmission direction.

2. The EC device of claim 1, wherein current flows through the first conductive film in the second direction during operation of the EC device.

3. The EC device of claim 1, wherein the first conductive lines comprise Al, Ag, Mo, Cu, Cr, alloys thereof, or multilayers thereof.

4. The EC device of claim 1, wherein the first conductive lines are parallel to each other.

5. The EC device of claim 4, wherein the first conductive lines extend in the second direction.

6. The EC device of claim 1, wherein the first conductive lines do not extend exclusively in the second direction.

7. The EC device of claim 6, wherein the first conductive lines comprise straight lines which extend in a direction between the first and the second directions at an angle less than 45 degrees from the second direction.

8. The EC device of claim 6, wherein the first conductive lines are curved.

9. The EC device of claim 6, wherein the first conductive lines are angled and contain plural segments that extend at a non-zero angle with respect to each other.

10. The EC device of claim 9, wherein the first conductive lines are zig-zag shaped, saw tooth shaped or serpentine.

11. The EC device of claim 1, wherein the EC device does not include conductive lines that extend in the first direction and electrically connect the first conductive lines.

12. The EC device of claim 1, wherein the first conductive lines have a width of 5 μm or less.

13. The EC device of claim 1, wherein the first conductive lines each comprise a stack of at least two layers that each comprise different metals.

14. The EC device of claim 1, wherein the first conductive lines each comprise a stack of at least three layers that each comprise different metals.

15. The EC device of claim 1, wherein:

the effective sheet resistance of the first conductor is less than 10 ohm/sq. in the second direction; and the effective sheet resistance of the first conductor is greater than 10 ohm/sq. in the first direction.

16. The EC device of claim 15, wherein the first conductor has a total effective sheet resistance of 6 ohm/sq. or less.

17. A window comprising the EC device of claim 1.

18. A method of brightening or darkening the window of claim 17 comprising flowing current through the first conductor in the second direction.

* * * * *